US012809178B2

(12) United States Patent
Lin et al.

(10) Patent No.: US 12,809,178 B2
(45) Date of Patent: Nov. 24, 2026

(54) DISPLAY APPARATUS

(71) Applicants: Fuzhou BOE Optoelectronics Technology Co., Ltd., Fuzhou (CN); BOE Technology Group Co., Ltd., Beijing (CN)

(72) Inventors: Jiantao Lin, Beijing (CN); Yao Liu, Beijing (CN); Zongxiang Li, Beijing (CN); Yawen Huang, Beijing (CN); Zuwen Liu, Beijing (CN)

(73) Assignees: Fuzhou BOE Optoelectronics Technology Co., Ltd., Fuzhou (CN); Beijing BOE Technology Development Co., Ltd., Beijing (CN)

( * ) Notice: Subject to any disclaimer, the term of this patent is extended or adjusted under 35 U.S.C. 154(b) by 200 days.

(21) Appl. No.: 18/765,373

(22) Filed: Jul. 8, 2024

(65) Prior Publication Data

US 2024/0361601 A1 Oct. 31, 2024

Related U.S. Application Data

(63) Continuation of application No. PCT/CN2023/084187, filed on Mar. 27, 2023.

(51) Int. Cl.
*G02B 27/01* (2006.01)
*B82Y 20/00* (2011.01)
(Continued)

(52) U.S. Cl.
CPC .......... *G02B 27/0172* (2013.01); *B82Y 20/00* (2013.01); *G02B 6/0036* (2013.01);
(Continued)

(58) Field of Classification Search
CPC .............. G02B 27/0172; G02B 6/0036; G02B 27/0977; B82Y 20/00
See application file for complete search history.

(56) References Cited

U.S. PATENT DOCUMENTS

2019/0265486 A1* 8/2019 Hansotte .............. G02B 6/0016
2021/0011290 A1* 1/2021 Maimone ............. G02B 6/0035
2022/0308343 A1* 9/2022 Yang .................. G02B 27/0172

FOREIGN PATENT DOCUMENTS

CN 110275303 A 9/2019
CN 110764265 A 2/2020
(Continued)

*Primary Examiner* — James A Dudek
(74) *Attorney, Agent, or Firm* — IPro, PLLC

(57) ABSTRACT

A display apparatus is disclosed and includes: a light guide element, including a first surface, a second surface arranged opposite to the first surface, and side surfaces connecting the first surface and the second surface; an image source assembly including two image sources at the side surfaces of the light guide element respectively, where light waves emitted from the image source are incident from the side surface into the light guide element; a coupling-out structure at a side of the second surface facing away from the first surface and configured to reflect a light reaching the second surface to the first surface; a super surface structure at a side of the first surface facing away from the second surface and configured to transmit lights reaching the first surface that are emitted from the two image source to a left eye and right eye of a user respectively.

14 Claims, 6 Drawing Sheets

(51) Int. Cl.
*F21V 8/00* (2006.01)
*G02B 27/09* (2006.01)

(52) U.S. Cl.
CPC .. *G02B 27/0977* (2013.01); *G02B 2027/0174* (2013.01); *G02B 2207/101* (2013.01)

(56) References Cited

FOREIGN PATENT DOCUMENTS

| | | | |
|---|---|---|---|
| CN | 110998413 | A | 4/2020 |
| CN | 111158153 | A | 5/2020 |
| CN | 113454387 | A | 9/2021 |
| CN | 113625386 | A | 11/2021 |
| CN | 114185174 | A | 3/2022 |
| CN | 114200571 | A | 3/2022 |
| CN | 115128737 | A | 9/2022 |
| CN | 217467351 | U | 9/2022 |
| WO | 2021073725 | A1 | 4/2021 |

* cited by examiner

DISPLAY APPARATUS

CROSS REFERENCE TO RELATED APPLICATIONS

The present disclosure is a continuation application of International Application No. PCT/CN2023/084187, filed Mar. 27, 2023, which is hereby incorporated by reference in its entirety.

TECHNICAL FIELD

The disclosure relates to the field of display technologies, in particular to a display apparatus.

BACKGROUND

Augmented Reality (AR) is a technology that integrates virtual information with the real world. The AR near-eye display device, represented by AR glasses, transmits the image on the display to the human eyes through a series of optical imaging elements, and its perspective allows the real scene reflected in the human eyes at the same time. AR glasses wearers see a real world overlaid with virtual images, greatly enhancing the sense of reality.

At present, one of the major technical problems hindering the development of head-mounted displays is vergence accommodation conflict (VAC), which refers to the fact that a single fixed virtual display screen makes the focus adjustment of the human eyes lenses and binocular convergence inconsistent, which can cause visual discomfort to the human eyes. The solution to this problem can be roughly divided into three ways: multifocal display technology, light field display technology, and retinal projection display technology. Among them, the retinal projection display is based on Maxwell's observation method. As shown in FIG. 1, the optical path in the traditional retinal projection display consists of three parts: the image source module, the filtering system, and the projection system. In the image source module, the light emitted from the light source is collimated and reflected into the spatial light modulator through the lens L1 and the beam splitter M, the parallel beam emitted after the modulation is loaded with digital image information, and then the thin beam with a large depth of field image is obtained through the filtering system. The filtering system consists of a lens 2 and a filter aperture, and the thin beam converges at a point in the center of the lens of the human eye through the lens L3, and then is projected directly onto the retina to form an image. However, the structure of this optical system is complex, which affects the size and volume of the display product.

SUMMARY

A display apparatus provided in embodiments of the disclosure, includes: a light guide element, an image source assembly, a coupling-out structure and a super surface structure. The light guide element includes a first surface, a second surface arranged opposite to the first surface, and side surfaces connecting the first surface and the second surface; where the first surface serves as a light exiting surface of the light guide element. The image source assembly includes two image sources at the side surfaces of the light guide element respectively, where light waves emitted from the image source are incident from a corresponding side surface into the light guide element. The coupling-out structure is located at a side of the second surface facing away from the first surface and configured to reflect a light reaching the second surface to the first surface. The super surface structure is located at a side of the first surface facing away from the second surface and configured to transmit lights reaching the first surface that are emitted from the two image source to a left eye and right eye of a user respectively.

In some embodiments, the coupling-out structure includes two coupling-out gratings, and the super surface structure includes two first super surface gratings. An orthographic projection of the coupling-out grating on the first surface is located within an orthographic projection of the first super surface gratings on the first surface. The coupling-out grating is configured to reflect a light reaching the second surface in such a way that a propagation direction of a reflected light is perpendicular to the first surface.

In some embodiments, the light guide element has a first symmetry axis perpendicular to the first surface; the two first super surface gratings are symmetrically arranged with respect to the first symmetry axis; and the two coupling-out gratings are symmetrically arranged with respect to the first symmetry axis.

In some embodiments, the super surface structure further includes a second super surface structure between the two first super surface gratings, and the second super surface grating is configured to transmit light waves reflected by an object at a side of the second surface facing away from the first surface to human eyes.

In some embodiments, two second super surface gratings are provided, the two second super surface gratings are symmetrically arranged with respect to the first symmetry axis.

In some embodiments, a refractive index of the super surface structure is greater than a refractive index of the light guide element.

In some embodiments, the image source assembly further includes: a light wave deflection structure configured to reflect the light waves emitted from the image source to the side surface to enter the light guide element, causing the light waves entering into the light guide element from the side surface to undergo total reflection transmission within the light guide element.

In some embodiments, the light wave deflection structure is a flat mirror.

In some embodiments, the image source includes a spatial light modulator for loading a hologram.

In some embodiments, the spatial light modulator is one of: a liquid crystal spatial light modulator, a digital micromirror spatial light modulator, or an adjustable super surface spatial light modulator.

In some embodiments, the super surface structure includes: a substrate and a plurality of nanopillars arranged in an array at a side of the substrate; where patterns of orthographic projections of the plurality of nanopillars on the substrate include at least two types of patterns.

In some embodiments, the plurality of nanopillars are divided into multiple first units, each first unit includes multiple nanopillars whose orthographic projections on the substrate having patterns of at least two types; types of patterns of orthographic projections of nanopillars for different first units on the substrate are the same.

In some embodiments, the nanopillar includes a first portion and a second portion between the substrate and the first portion. Orthographic projections of first portions of the multiple nanopillars in each first unit on the substrate have patterns of at least two types, and orthographic projections of second portions of the multiple nanopillars in each first unit on the substrate have a same pattern.

In some embodiments, sizes and rotation angles of multiple nanopillars whose orthographic projections on the substrate having the same pattern in different first units are not exactly the same.

In some embodiments, the nanopillar includes a first portion and a second portion; and sizes and rotation angles of multiple first portions whose orthographic projections on the substrate having the same pattern in different first units are not exactly the same.

In some embodiments, shapes of orthographic projections of the multiple nanopillars in each first unit on the substrate include at least two of: rectangle, triangle, rhombus, circle, or ellipse.

In some embodiments, the super surface structure includes a first super surface grating and a second super surface grating. Types of patterns, on the substrate, of orthographic projections of nanopillars included in a first unit in the first super surface grating and types of patterns, on the substrate, of orthographic projections of nanopillars of a first unit in the second super surface grating are same. A phase distribution of nanopillars in the first super surface grating is different from a phase distribution of nanopillars in the second super surface grating.

BRIEF DESCRIPTION OF FIGURES

For making technical solutions of embodiments of the disclosure clearer, the drawings in the embodiments of the disclosure will be briefly described below. Obviously, drawings described below are only some embodiments of the disclosure, for those skilled in the art, other drawings can be obtained from these drawings without creative work.

DETAILED DESCRIPTION

Figure 1:
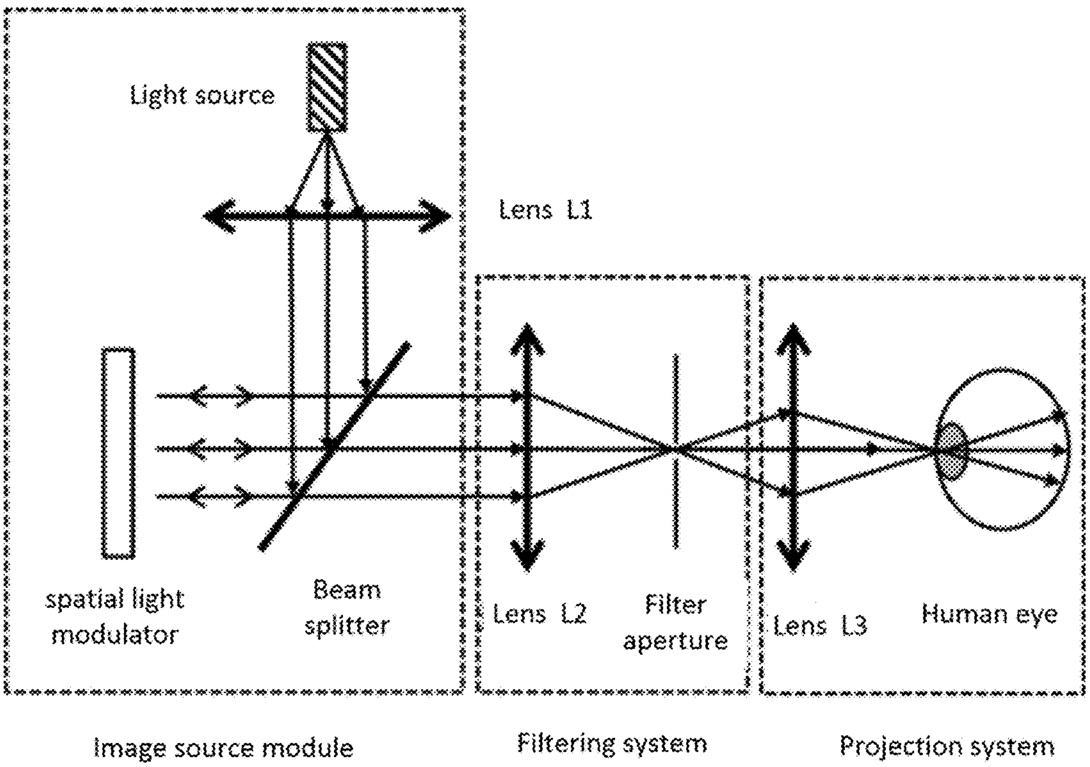
FIG. 1 is a schematic structural diagram of a display apparatus in the related art.

In order to make the objectives, technical solutions, and advantages of embodiments of the disclosure clearer, the technical solutions of the embodiments of the disclosure will be described clearly and completely in conjunction with the drawings of the embodiments of the disclosure. Obviously, the described embodiments are some, not all, of the embodiments of the disclosure. In addition, the embodiments and features in the embodiments of the disclosure may be combined with each other without conflict. Based on the described embodiments of the disclosure, all other embodiments obtained by those of ordinary skill in the art without the need for creative labor fall within the scope of protection of the disclosure.

Unless otherwise defined, technical or scientific terms used in the disclosure shall have the common meanings understood by those of ordinary skill in the art to which the disclosure belongs. "First", "second" and similar words used in the disclosure do not indicate any order, quantity or importance, but are only used to distinguish different components. "Include" or "comprise" and other similar words mean that an element or item appearing before the word encompasses elements or items listed after the word and their equivalents, without excluding other elements or items. "Connect" or "link" and other similar words are not limited to physical or mechanical connections, but may include electrical connections, whether direct or indirect.

It should be noted that the size and shape of each figure in the drawings do not reflect a true scale, but are only intended to illustrate the content of the disclosure. The same or similar reference numerals indicate the same or similar elements or elements with the same or similar functions throughout.

Figure 2:
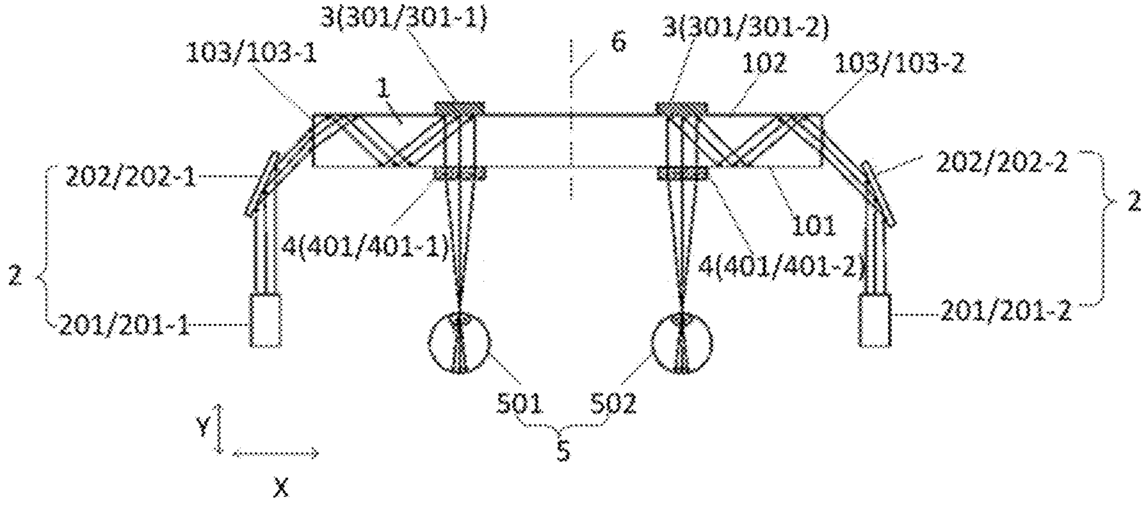
FIG. 2 is a schematic structural diagram of a display apparatus provided in embodiments of the disclosure.

Embodiments of the disclosure provide a display apparatus, as shown in FIG. 2, including:

- a light guide element 1, including: a first surface 101, a second surface 102 arranged opposite to the first surface 101, and side surfaces 103 connecting the first surface 101 and the second surface 102; where the first surface serves as a light exiting surface of the light guide element;
- an image source assembly 2, including two image sources 201 at the side surfaces 103 of the light guide element 1, respectively, where light waves emitted from the image source 201 are incident from a corresponding side surface 103 into the light guide element 1;
- a coupling-out structure 3 at a side of the second surface 102 facing away from the first surface 101, and configured to reflect a light reaching the second surface 102 to the first surface 101; and
- a super surface structure 4 at a side of the first surface 101 facing away from the second surface 102, and configured to transmit lights reaching the first surface 101 that are emitted from the two image sources 201 to a left eye 501 and right eye 502 of a user, respectively.

It should be noted that, in the display apparatus provided by the embodiments of the disclosure, the super surface structure is composed of a dense arrangement of surface sub-wavelength structural units that act as resonant optical antennas, and the light waves resonate in the surface sub-wavelength structural units, providing people with the ability to manipulate the incident light waves. The super surface structure is not limited by the traditional geometric optics theory, and can be used to produce ultra-thin, flat, and aberration-free optical devices on a smaller scale by using a simple process, to replace bulky or difficult-to-make traditional geometric optical devices. For example, the super surface structure can replace lenses, simplify the complexity of optical systems, and reduce the size and volume of products that rely on optical device imaging. The super surface structure can realize the optical response of the Bragg grating by designing the size and other factors of the surface sub-wavelength structure. Compared with the helical tooth structure of the Bragg grating, the super surface structure is generally composed of sub-wavelength structures with a vertical sidewall, which is easier to process.

In the display apparatus provided by the embodiments of the disclosure, the image sources are arranged at side surfaces of the light guide element, and light waves emitted from the two image sources are respectively incident into the light guide element from the two side surfaces, reach the coupling-out structure, are coupled and output to the super surface structure, and then transmitted to the user's left and right eyes through the super surface structure. The display apparatus has a simple structure without additional light guide structures and optical devices such as lens, reducing the size and volume of products that rely on optical device imaging.

It should be noted that, as shown in FIG. 2, the two image sources 201 are distinguished and indicated by reference signs 201-1 and 201-2, respectively. The image source 201-1 is located at a left side of the light guide element 1, and the light emitted from the image source 201-1 reaches the left eye 501 through the light guide element 1, the coupling-out structure 3, and the super surface structure 4, for imaging. The image source 201-2 is located at a right side of the light guide element 1, and the light emitted from the image source 201-2 reaches the right eye 502 through the light guide element 1, the coupling-out structure 3, and the super surface structure 4, for imaging.

In specific implementations, the display apparatus provided by the embodiments of the disclosure can be, for example, applied to a near-eye display scenario. The display apparatus can be, for example, a wearable device with a display function, such as glasses and helmet.

In some embodiments, the image source can include a spatial light modulator for loading a hologram.

It should be noted that the hologram is a three-dimensional image, and the hologram contains information such as the size, shape, brightness, and contrast of the recorded object. In specific implementations, the two image sources load holograms for the left eye view and holograms for the right eye view, respectively. The holographic light waves emitted from the image sources contain virtual digital image information, so that when the holographic light waves emitted from the two image sources converge to the lenses of the human eyes through the light guide element, coupling-out structure, and super surface structure, and are imaged on the retina, the user can view the three-dimensional image.

In specific implementations, the image source can further include a light source, which may be, for example, a laser light source. After the light waves emitted from the light source reach the spatial light modulator, the spatial light modulator modulates the parameters of the light field, such as modulating the amplitude of the light field, modulating the phase based on the refractive index, modulating the polarization state by rotating the polarization plane, or realizing the conversion of incoherent and coherent light, so as to write certain information into the light waves and achieve the purpose of the light wave modulation.

In some embodiments, the spatial light modulator is one of: a liquid crystal spatial light modulator, a digital micromirror spatial light modulator, or an adjustable super surface spatial light modulator.

In some embodiments, as shown in FIG. 2, the image source assembly 2 further can include a light wave deflection structure 202, which is configured to reflect the light waves emitted from the image source 201 to the side surface 103 to enter the light guide element 1, causing the light waves entering into the light guide element 1 from the side surface 103 to undergo total reflection transmission within the light guide element 1.

In the display apparatus provided in the embodiments of the disclosure, the propagation direction of the light waves emitted from the image sources can be changed via the light wave deflection structure, causing the light waves to undergo total reflection transmission within the light guide element after entering the light guide element, which can improve light utilization.

In specific implementations, as shown in FIG. 2, the display apparatus includes two light wave deflection structures 202 indicated by reference signs 202-1 and 202-2 respectively, that is, the light wave deflection structures 202 correspond to the image sources 201 in a one-to-one manner. Here, the light wave deflection structure 202-1 corresponds to the image source 201-1, and reflects the light waves emitted from the image source 201-1 to the side surface of the light guide element 1; the light wave deflection structure 202-2 corresponds to the image source 201-2, and reflects the light waves emitted from the image source 201-2 to the side surface of the light guide element 1.

In specific implementations, as shown in FIG. 2, the two image sources 201 are arranged along a first direction X, the first surface 101 and the second surface 102 are arranged along a second direction Y, and the image source 201 and the light wave deflection structure 202 at a same side surface 103 of the light guide element 1 are also arranged along the second direction Y. Further, the image sources 201 are located at a side of the first surface 101 away from the second surface 102.

In specific implementations, a refractive index of the light guide element is greater than a refractive index of air. Thus, when the light waves reach the interface between the light guide element and the air and the angle of incidence is greater than the critical angle, total reflection can occur, which is advantageous for improving light utilization.

In specific implementations, for example, the angle of incidence of the light waves reflected by the light wave deflection structure to enter the side surface of the light guide element can be selected based on the shape and refractive index of the light guide element, to make the angle of incidence of the light waves entering from the side surface of the light guide element onto the second surface and the first surface is greater than the critical angle. When the refractive index of the light guide element is greater than the refractive index of air, the angle of incidence of the light waves onto the side surface of the light guide element is greater than 0 and less than 90°.

In some embodiments, the light wave deflection structure is a flat mirror. That is, the embodiments of the disclosure utilizes flat mirrors to deflect the propagation direction of the light waves emitted from the image source along the second direction, causing the angle of incidence of the deflected light waves onto the side surface of the light guide element to be greater than 0 and less than 90°, which is structurally simple and easy to implement.

In some embodiments, as shown in FIG. 2, the coupling-out structure 3 includes two coupling-out gratings 301, distinguished by reference signs 301-1 and 301-2 respectively; the super surface structure 4 includes two first super surface gratings 401, distinguished by the reference signs 401-1 and 401-2 respectively.

An orthographic projection of the coupling-out grating 301 on the first surface 101 is located within an orthographic projection of the first super surface grating 401 on the first surface 101.

The coupling-out grating 301 is configured to reflect light reaching the second surface 102 in such a way that a propagation direction of the reflected light is perpendicular to the first surface 101.

In specific implementations, as shown in FIG. 2, the coupling-out grating 301-1 corresponds to the first super surface grating 401-1, that is, the orthographic projection of the coupling-out grating 301-1 on the first surface 101 is located within the orthographic projection of the first super surface grating 401-1 on the first surface 101. Additionally, the coupling-out grating 301-1 and the first super surface grating 401-1 correspond to the image source 201-1. The light emitted from the image source 201-1 is reflected by the light wave deflection structure 202-1, then enters the light guide element 1 from the side surface, reaches the interface between the coupling-out grating 301-1 and the light guide element 1, is coupled out by the coupling-out grating 301-1 to the interface between the first super surface grating 401-1 and the light guide element 1, and then converges to the left eye 501 via the first super surface grating 401-1. The coupling-out grating 301-2 corresponds to the first super surface grating 401-2, that is, the orthographic projection of the coupling-out grating 301-2 on the first surface 101 is located within the orthographic projection of the first super surface grating 401-2 on the first surface 101. Additionally, the coupling-out grating 301-2 and the first super surface grating 401-2 correspond to the image source 201-2. The light emitted from the image source 201-2 is reflected by the light wave deflection structure 202-2, then enters the light guide element 1 from the side surface, reaches the interface between the coupling-out grating 301-2 and the light guide element 1, is coupled out by the coupling-out grating 301-2 to the interface between the first super surface grating 401-2 and the light guide element 1, and then converges to the right eye 502 via the first super surface grating 401-2.

In some embodiments, a refractive index of the super surface structure is greater than the refractive index of the light guide element.

In specific implementations, the refractive index of the light guide element is greater than or equal to 1.5 and less than 2. The refractive index of the super surface structure is, for example, greater than or equal to 2 and less than or equal to 3.

Figure 3:
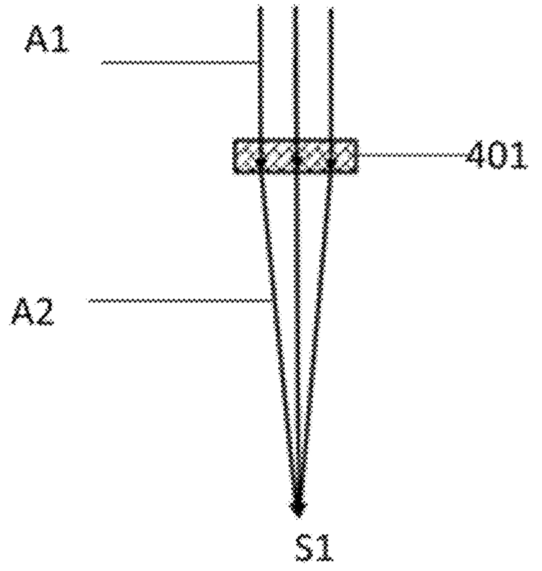
FIG. 3 is a schematic structural diagram of a first super surface grating provided in embodiments of the disclosure.

In specific implementations, the first super surface grating has lens functionality, and the refractive index of the first super surface grating is greater than that of the light guide element, so that when light propagates to the interface between the first super surface grating and the light guide element, the light can pass through the first super surface grating, and converge to the human eye after modulation by the first super surface grating. As shown in FIG. 3, for example, the first super surface grating 401 has a transmissive coaxial superlens function, that is, the incident light A1 passes through the first super surface grating 401 and is emitted as light A2, and the emitted light A2 converge to point S1. The point S1 is the focal point of the equivalent lens corresponding to the first super surface grating 401, and lies on the straight line where the optical axis of the equivalent lens corresponding to the first super surface grating 401 is located.

In some embodiments, the light guide element 1 has a first symmetry axis 6, and the first symmetry axis 6 is parallel to an arrangement direction of the second surface and the first surface 101, i.e., parallel to the second direction Y.

In some embodiments, as shown in FIG. 2, the first surface 101 is flat. That is, the first symmetry axis 6 is perpendicular to the first surface 101.

Of course, in specific implementations, the first surface can also be curved.

In specific implementations, the first surface is parallel to the second surface. That is, when the first surface is flat, the second surface is also flat. When the first surface is curved, the second surface is also curved.

In some embodiments, as shown in FIG. 2, the two first super surface gratings 401 are symmetrically arranged with respect to the first symmetry axis 6; the two coupling-out gratings 301 are symmetrically arranged with respect to the first symmetry axis 6.

In some embodiments, as shown in FIG. 2, the two image sources 201 are symmetrically arranged with respect to the first symmetry axis 6; the two light wave deflection structures 202 are symmetrically arranged with respect to the first symmetry axis 6.

In specific implementations, the image source 201-1, coupling-out grating 301-1, and first super surface grating 401-1 are located at the same side of the first symmetry axis 6, while the image source 201-2, coupling-out grating 301-2, and first super surface grating 401-2 are located at the same side of the first symmetry axis 6.

Figure 4:
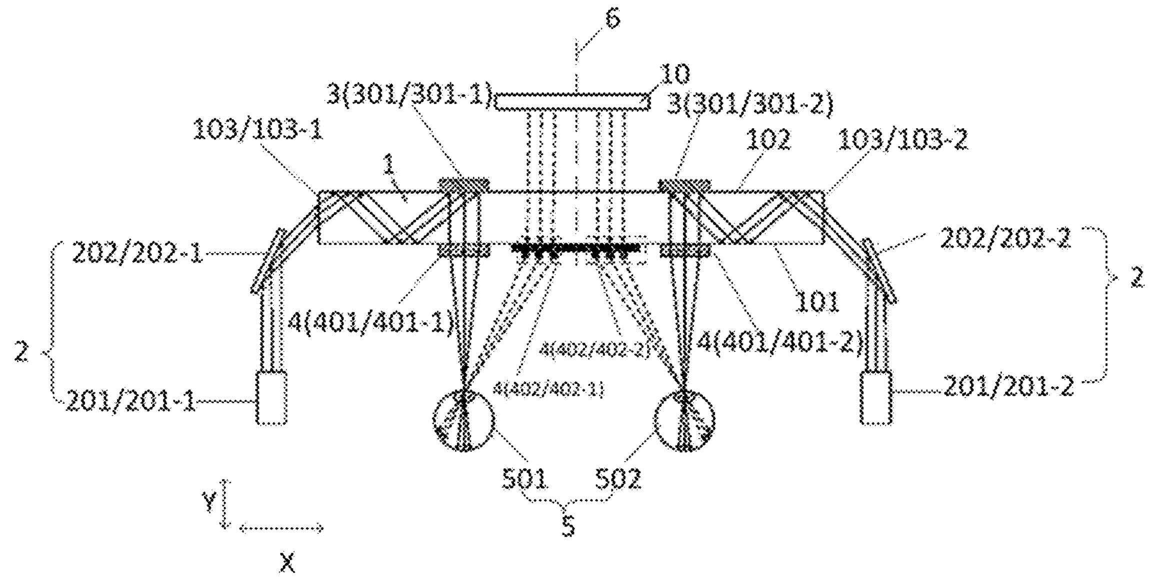
FIG. 4 is another schematic structural diagram of a display apparatus provided in embodiments of the disclosure.

In some embodiments, as shown in FIG. 4, the super surface structure 4 further includes a second super surface grating 402 between the two first super surface gratings 401. The second super surface grating 402 is configured to transmit light waves reflected by an object at a side of the second surface 102 facing away from the first surface 101 to the human eyes 5.

In specific implementations, as shown in FIG. 4, ambient light waves from a real object 10 pass through the light guide element 1 and are refracted by the second super surface grating 402 to focus off-axis at the lenses of the human eyes 5 and form an image on the retinas.

That is, in the display apparatus provided by the embodiments, virtual image information provided by image sources and real-world ambient light are focused at the lenses of the human eyes and imaged on the retinas, allowing the user to simultaneously observe real-world scenes and augmented reality images.

In specific implementations, as shown in FIG. 4, the display apparatus includes two second super surface gratings 402 indicated by reference signs 402-1 and 402-2, respectively.

Figure 5:
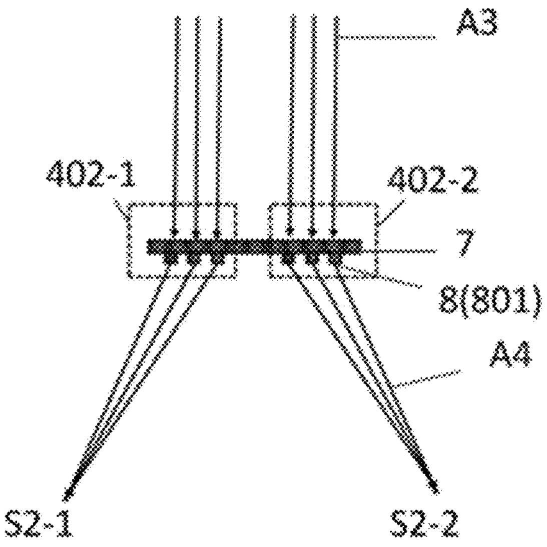
FIG. 5 is a schematic structural diagram of a second super surface grating provided in embodiments of the disclosure.

In specific implementations, the second super surface grating has lens functionality, and the refractive index of the second super surface grating is greater than the refractive index of the light guide element. Thus, when light propagates to the interface between the second super surface grating and the light guide element, it can pass through the second super surface grating, and converge to the human eye after modulation by the second super surface grating. As shown in FIG. 5, for example, the second super surface grating 402 has a transmissive off-axis superlens function, meaning the incident light A3 passes through the second super surface grating 402 and is emitted as light A4, and the emitted light A4 converges to point S2. The point S2 is the focal point of the equivalent lens corresponding to the second super surface grating 402, and does not lie on the straight line where the optical axis of the equivalent lens corresponding to the second super surface grating 402 is located. The emitted light A4 obtained after the incident light A3 passing through the second super surface grating 402-1 converges to the point S2-1, and the point S2-1 corresponds to the left eye; the emitted light A4 obtained after the incident light A3 passing through the second super surface grating 402-2 converges to the point S2-2, and the point S2-2 corresponds to the right eye.

In some embodiments, as shown in FIG. 4, the two second super surface gratings 402 are symmetrically arranged with respect to the first symmetry axis 6.

Figure 6:
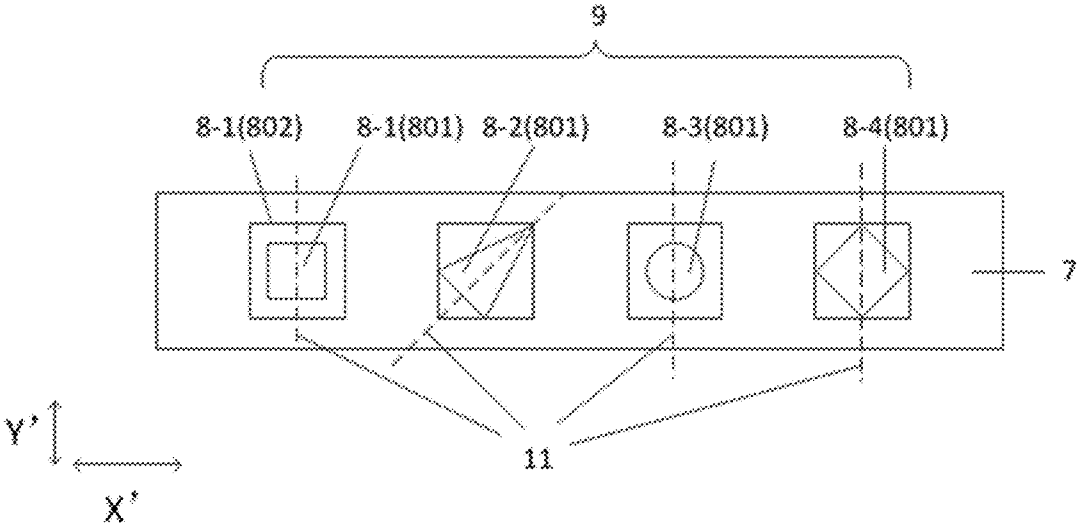
FIG. 6 is a schematic structural diagram of a super surface structure provided in embodiments of the disclosure.
Figure 7:
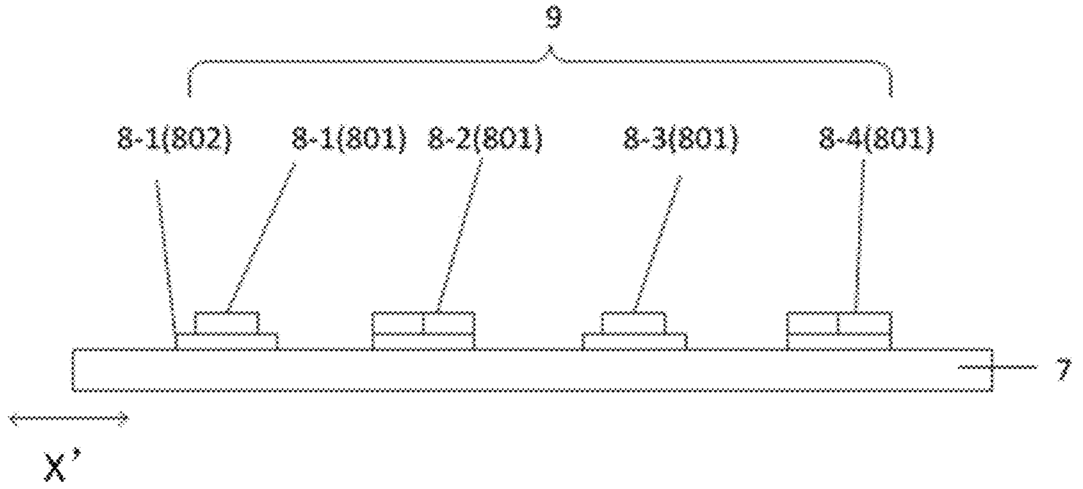
FIG. 7 is a side view of the structure in FIG. 6.

In some embodiments, as shown in FIGS. 5, 6, and 7, the super surface structure 4 includes a substrate 7 and a plurality of nanopillars 8 arranged in an array at a side of the substrate 7.

In some embodiments, as shown in FIGS. 6 and 7, the patterns of orthographic projections of the plurality of nanopillars 8 on the substrate 7 include at least two types of patterns.

It should be noted that FIG. 7 is a side view along the fourth direction Y' in FIG. 6.

In some embodiments, the plurality of nanopillars is divided into a plurality of first units. Each first unit includes multiple nanopillars whose orthographic projections on the substrate having patterns of at least two types. The types of patterns of the orthographic projections of the nanopillars on the substrate are the same for different first units.

It should be noted that FIGS. 6-7 only show one first unit 9.

In some embodiments, the shapes of orthographic projections of multiple nanopillars included in each first unit on the substrate include at least two of the following: rectangle, triangle, rhombus, circle, or ellipse.

In some embodiments, as shown in FIGS. 5-7, the nanopillar 8 includes a first portion 801. In specific implementations, orthographic projections of the first portions on the substrate have patterns of at least two types.

It should be noted that FIG. 5 uses the example of nanopillar 8 including only the first portion 801 for illustration.

Alternatively, in some embodiments, as shown in FIGS. 6-7, the nanopillar 8 further includes a second portion 802 between the first portion 801 and the substrate. Patterns of orthographic projections of the second portions 802 included in multiple nanopillars on the substrate are same.

It should be noted that in FIG. 6, the example is given with the shapes of the orthographic projections of the second portions 802 of multiple nanopillars 8 on the substrate being rectangular, and in specific implementations, the shapes of the orthographic projections of the second portions 802 of multiple nanopillars 8 on the substrate can be circular or other shapes.

It should also be noted that, in FIG. 6, each first unit 9 includes multiple nanopillars 8 arranged along a third direction X'. The orthographic projections of the second portions 802 of multiple nanopillars 8 included in each first unit on the substrate have the same pattern, while the orthographic projections of the first portions 801 of multiple nanopillars 8 included in each first unit on the substrate 7 have four different patterns. The first unit 9 includes multiple nanopillars 8, namely the first nanopillar 8-1, the second nanopillar 8-2, the third nanopillar 8-3, and the fourth nanopillar 8-4. The orthographic projection of the first portion 801 of the first nanopillar 8-1 on the substrate 7 is rectangular, the orthographic projection of the first portion 801 of the second nanopillar 8-2 on the substrate 7 is triangular, the orthographic projection of the first portion 801 of the third nanopillar 8-3 on the substrate 7 is circular, and the orthographic projection of the first portion 801 of the fourth nanopillar 8-4 on the substrate 7 is rhombus.

It should also be noted that, as shown in FIG. 6, a width of the first unit 9 along the third direction X' is a period of the super surface grating. In specific implementations, the widths of multiple first units along the third direction are the same, and the widths of the first units along the fourth direction are also the same.

It should also be noted that, as shown in FIG. 6, the patterns of orthographic projections of the multiple first portions included in each first unit on the substrate are all different, that is, the first portion corresponding to each type of pattern is set only once within each unit.

Of course, in specific implementations, within one first unit, there can be multiple first portions corresponding to each type of pattern.

Figure 8:
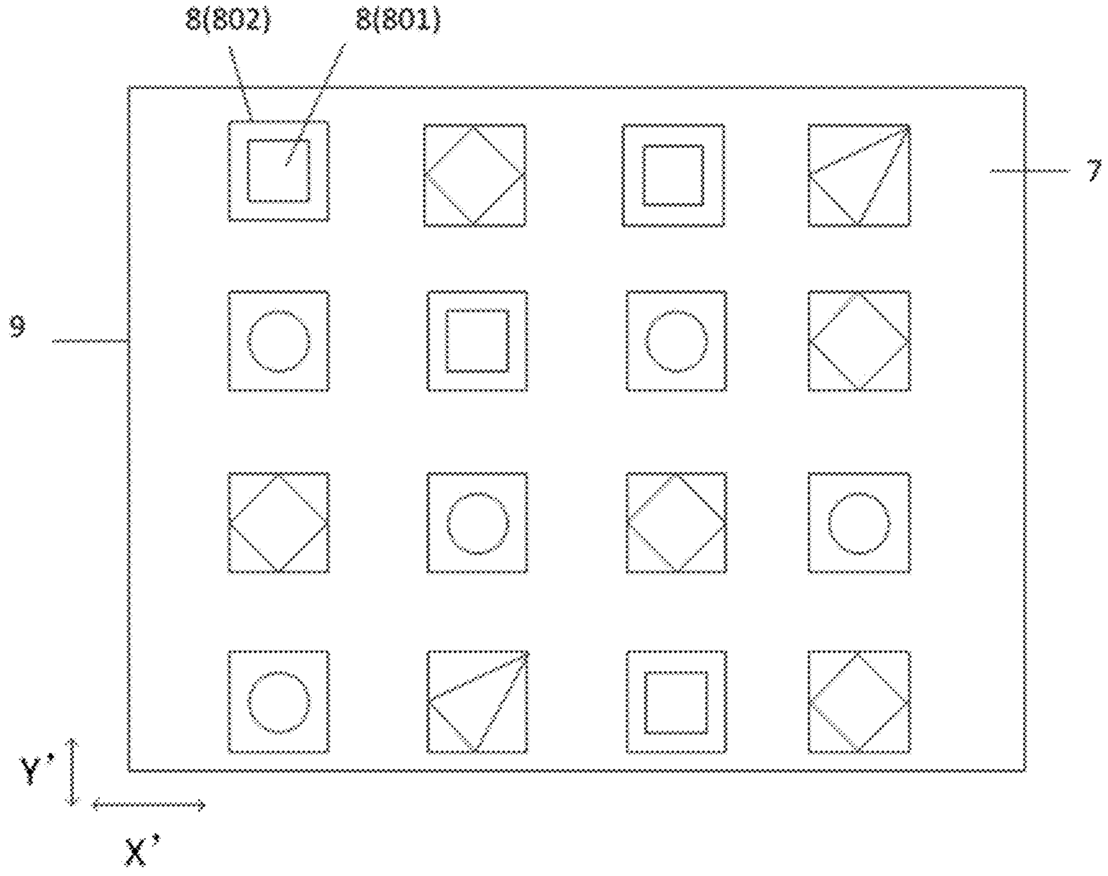
FIG. 8 is another schematic structural diagram of a super surface structure provided in embodiments of the disclosure.
Figure 9:
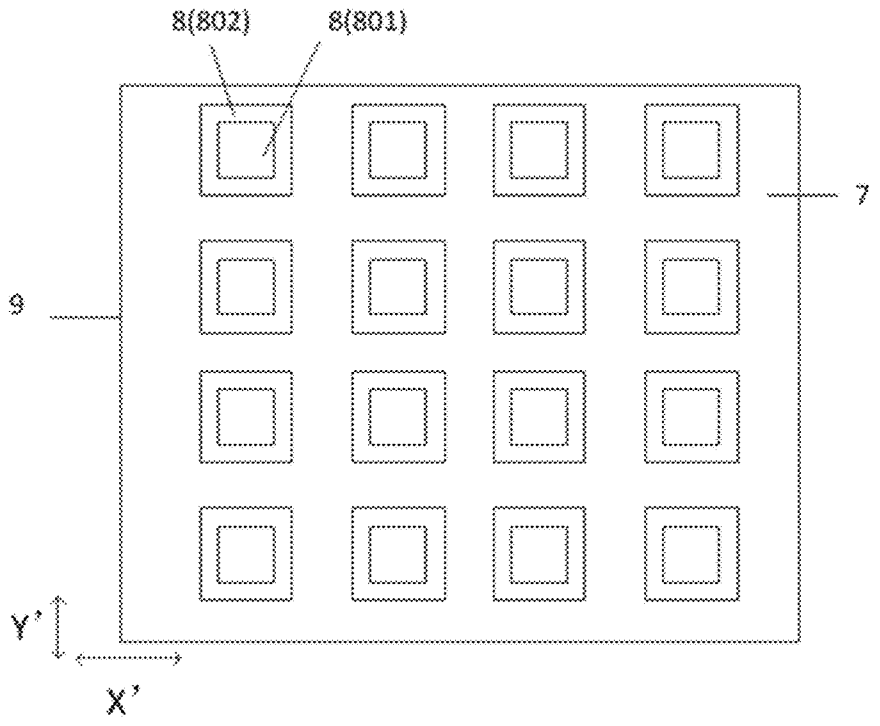
FIG. 9 is a schematic structural diagram of a first unit provided in embodiments of the disclosure.
Figure 10:
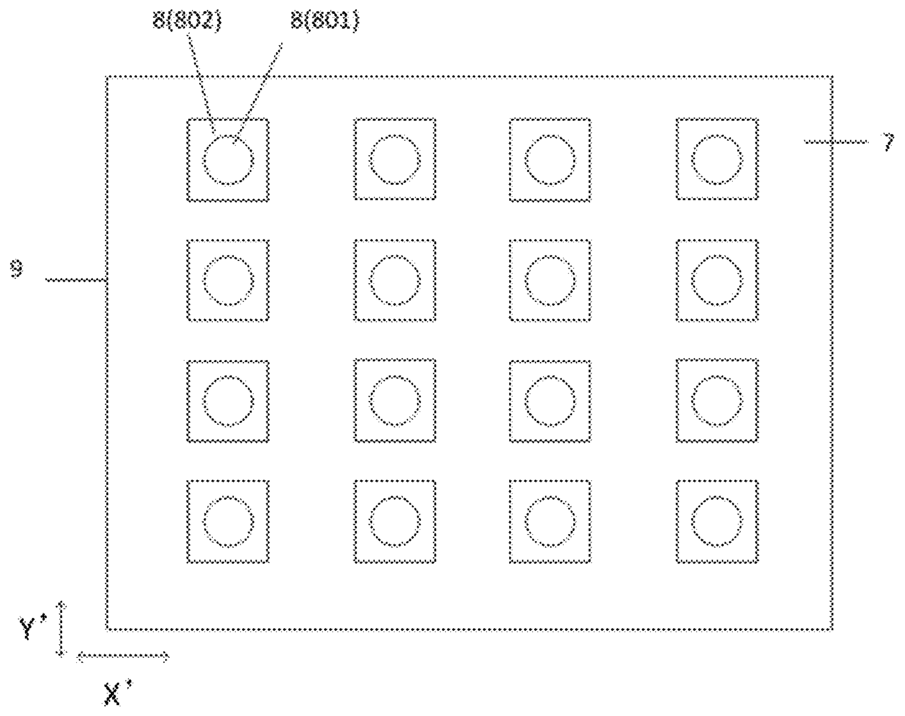
FIG. 10 is another schematic structural diagram of a first unit provided in embodiments of the disclosure.
Figure 11:
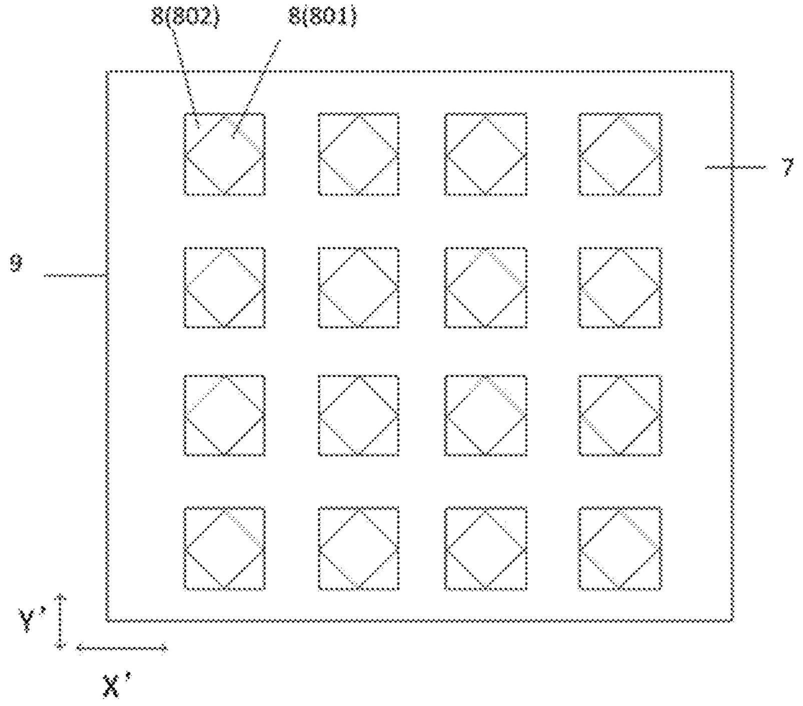
FIG. 11 is yet another schematic structural diagram of a first unit provided in embodiments of the disclosure.
Figure 12:
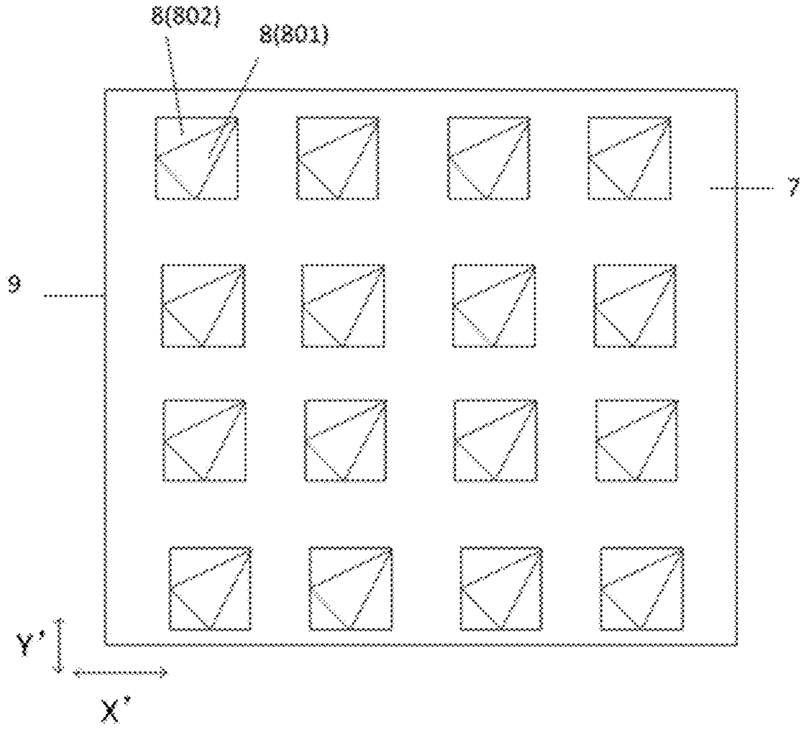
FIG. 12 is yet another schematic structural diagram of a first unit provided in embodiments of the disclosure.

In some embodiments, as shown in FIG. 8, each first unit 9 includes multiple nanopillars 8 arranged in arrays along the third direction X' and the fourth direction Y'. The arrayed nanopillars 8 are divided into multiple nanopillar rows 901 and multiple nanopillar columns 902. Each nanopillar row 901 includes multiple nanopillars 8 whose orthographic projections on the substrate 7 having patterns of at least two types, and each nanopillar column 902 includes multiple nanopillars 8 whose orthographic projections on the substrate 7 having patterns of at least two types. In FIG. 8, the nanopillar 8 includes the first portion 801 and the second portion 802. The orthographic projections of second portions 802 of multiple nanopillars 8 on the substrate have the same pattern, while orthographic projections of the first portions 801 of multiple nanopillars 8 included in each nanopillar row 901 on the substrate 7 have patterns of at least two types, and the orthographic projections of the first portions 801 of multiple nanopillars 8 included in each nanopillar column 902 on the substrate 7 have patterns of at least two types.

In some embodiments, as shown in FIG. 8, when different nanopillar rows 901 include multiple nanopillars 8 with the first portions 801 whose orthographic projections on the substrate 7 having multiple patterns, the arrangement order of the first portions 801 of multiple nanopillars 8 within different nanopillar rows 901 may not be exactly the same. When different nanopillar columns 902 include multiple nanopillars 8 with the first portions 801 whose orthographic projections on the substrate having multiple patterns, the arrangement order of the first portions 801 of multiple nanopillars 8 within different nanopillar columns 902 may not be exactly the same.

In some embodiments, when the types of patterns of the orthographic projections of the first portions of multiple nanopillars included in different first units are the same, the quantity of the first portion corresponding to each type of pattern may be the same or different.

In some embodiments, the arrangement order of the first portions corresponding to various types of patterns included in different first units may not be exactly the same.

In some embodiments, thicknesses of the plurality of nanopillars included in the super surface structure are the same in a direction perpendicular to the substrate.

In some embodiments, each nanopillar includes a first portion and a second portion. Thicknesses of the first portions of the plurality of nanopillars in the direction perpendicular to the substrate is the same, and thicknesses of the second portions of the plurality of nanopillars in the direction perpendicular to the substrate is also the same. The thickness of the first portion and the thickness of the second portion in the direction perpendicular to the substrate can be the same or different.

In some embodiments, among multiple nanopillars whose orthographic projections on the substrate having the same pattern included in different first units, sizes and rotation angles of the multiple nanopillars may not be exactly the same.

It should be noted that the rotation angle of a nanopillar refers to the angle at which the symmetry axis of the pattern of the orthographic projection of the nanopillar on the substrate is rotated with respect to the third direction X' or the fourth direction Y'. The size of a nanopillar refers to the width of the pattern of the orthographic projection of the nanopillar on the substrate in the direction parallel to the symmetry axis of the pattern and the width of the pattern of the orthographic projection of the nanopillar on the substrate in the direction perpendicular to the symmetry axis of the pattern.

When a nanopillar only includes the first portion, the sizes and rotation angles of the first portions of the multiple nanopillars may not be exactly the same. When a nanopillar includes both the first portion and the second portion, the sizes and rotation angles of the first portions of the multiple nanopillars may not be exactly the same, while the sizes and rotation angles of the second portions of the multiple nanopillars may be exactly the same or not exactly the same.

For example, as shown in FIG. 6, the sizes and rotation angles of the second portions 802 of multiple nanopillars 8 are exactly the same. The pattern of the orthographic projection of the first portion 801 of the nanopillar 8 on the substrate 7 has a second symmetry axis 11. When the rotation angle is 0° or 180°, the second symmetry axis 11 is parallel to the fourth direction Y'. The rotation angle of the first portion 801 of the first nanopillar 8-1, the rotation angle of the first portion 801 of the third nanopillar 8-3, and rotation angle of the first portion 801 of the fourth nanopillar 8-4 are 0°, and the rotation angle of the first portion 801 of the second nanopillar 8-2 is greater than 0° and less than 90°.

In specific implementations, within one first unit, when there are multiple first portions corresponding to each type of pattern, as shown in FIG. 8, the sizes and rotation angles of multiple of the multiple first portions 801 corresponding to the same pattern are exactly the same. However, in specific implementations, the sizes and rotation angles of multiple first portions 801 corresponding to the same pattern may not be exactly the same.

It should be noted that the specific functions realized by the super surface grating varies with different phase distributions of light passing through the super surface structure. In the display apparatus provided by the embodiments of the disclosure, the period, the types and quantities of nanopillar patterns included in each first unit, the sizes, rotation angles and distribution of nanopillars, and the height of the nanopillar array in the first super surface grating or the second super surface grating affect the phase distribution of light passing through the super surface grating.

It should be noted that if the pattern of nanopillars included in the super surface structure only has one type, then the phase distribution can only be adjusted by the period, the size of the nanopillar, the rotation angle of the nanopillar, and the height of the nanopillar array. However, in the display apparatus provided by the embodiments of the disclosure, since each first unit includes nanopillars of multiple patterns, the phase distribution of the super surface grating can be adjusted by, not only the period, the size of the nanopillar, the rotation angle of the nanopillar, and the height of the nanopillar array, but also the types, quantities, and distribution of nanopillar patterns included in each first unit, thus increasing the phase adjustment dimension of the super surface grating, and making the light modulation via the super surface grating more refined and accurate. When a nanopillar includes both the first portion and the second portion, in addition to adjusting by the size, rotation angle, height, type, quantity, and distribution of the first portion, it can also be further adjusted by the size, rotation angle, height, type, quantity, and distribution of the second portion, thus further increasing the phase adjustment dimension of the super surface grating, making the light modulation via the super surface grating more refined and accurate.

In some embodiments, the super surface structure includes a first super surface grating and a second super surface grating; the types of patterns, on the substrate, of orthographic projections of nanopillars included in the first units of the first super surface grating are the same as the types of patterns, on the substrate, of orthographic projections of nanopillars included in the first units of the second super surface grating; and the phase distribution of the nanopillars in the first super surface grating is different from phase distribution in the second super surface grating.

In some embodiments, when the display apparatus includes two first super surface gratings, since the first super surface grating is a transmissive coaxial superlens, the settings for nanopillars in the two first super surface gratings can be exactly the same.

In some embodiments, when the display apparatus includes two second super surface gratings, as the second super surface grating is a transmissive off-axis superlens, and the light waves converge to different positions through the two second super surface gratings, the types of patterns, on the substrate, of nanopillars included in the first units of the two second super surface gratings are the same, but the distributions of nanopillars are different, and the positions of the focal points of the two second super surface gratings are symmetrically arranged with respect to the first symmetry axis.

In specific implementations, the period, the types and quantities of nanopillar patterns included in each first unit, the size and distribution of nanopillars, and the height of the nanopillar array can be specifically designed based on the specific functions of the super surface structure. For cases where each first unit includes nanopillars of multiple patterns, the phase distribution of a single pattern nanopillar array as shown in FIGS. 9 to 12 can be simulated, and the optical parameters of the super surface grating can be preset. Different nanopillar patterns can be matched according to the phase distribution to form a super surface grating including nanopillars of multiple patterns. In specific implementations, software such as VirtualLab Fusion can be used to calculate the optical intensity in the working area of the super surface grating, simulate the light field tracing effects under multiple viewing angles, and finally select the required number and position of partitions according to actual needs to produce the super surface grating.

In some embodiments, the material of the substrate includes at least one of the following: fused quartz or titanium dioxide. The material of the nanopillars includes at least one of the following: titanium dioxide, silicon nitride, gallium nitride, or gallium phosphide.

In specific implementations, the materials of the substrate and nanopillars can be the same or different.

In specific implementations, for example, the fabrication process of the super surface grating is as follows: first, a base substrate is provided, and resist is spun-coated on the substrate using electron beam lithography, then the pattern of the nanopillar array can be fabricated using electron beam lithography. Then, the material of the nanopillars is deposited on the pattern. At this time, the material of the nanopillars is deposited not only on the resist but also on the base substrate surface. The base substrate is peeled off using a peeling technique to obtain the super surface grating.

The display apparatus provided by the embodiments of the disclosure can be any product or component with display function, such as glasses, helmets, etc. Other essential components of the display apparatus should be understood by those skilled in the art in this field and are not described here, nor should they be considered as limitations to this application.

In summary, according to the display apparatus provided in the embodiments of the disclosure, the image sources are arranged at the side surfaces of the light guide element, and the light waves emitted from the two image sources respectively enter from the two side surfaces of the light guide element, reach the coupling-out structure, are coupled out and transmitted to the super surface structure, and then transmitted to the user's left and right eyes for imaging. The structure of this display apparatus is simple, without the need for multiple layers of light guide structures or optical devices such as lenses, thereby reducing the size and volume of products that rely on optical device imaging.

Although preferred embodiments of the disclosure have been described, additional changes and modifications may be made to these embodiments once the basic creative concepts are known to those skilled in the art. Accordingly, the appended claims are intended to be construed to include the preferred embodiments and all changes and modifications falling within the scope of the disclosure.

Obviously, those skilled in the art may make various changes and variations to the disclosure without deviating from the spirit and scope of the disclosure. Thus, if these modifications and variations of the disclosure are within the scope of the claims of the disclosure and their equivalents, the disclosure is also intended to include such modifications and variations.

What is claimed is:

1. A display apparatus, comprising:

a light guide element, comprising: a first surface, a second surface arranged opposite to the first surface, and side surfaces connecting the first surface and the second surface; wherein the first surface serves as a light exiting surface of the light guide element, and the light guide element has a first symmetry axis perpendicular to the first surface;

an image source assembly, comprising two image sources at the side surfaces of the light guide element, respectively, wherein light waves emitted from the image source are incident from a corresponding side surface into the light guide element; wherein the two image sources are symmetrically disposed about the first symmetry axis;

a coupling-out structure at a side of the second surface facing away from the first surface, and configured to reflect a light reaching the second surface to the first surface; wherein the coupling-out structure is arranged symmetrically about the first symmetry axis; and a super surface structure at a side of the first surface facing away from the second surface, and configured to transmit lights reaching the first surface that are emitted from the two image sources to a left eye and right eye of a user, respectively;

wherein the super surface structure comprises: a substrate and a plurality of nanopillars arranged in an array at a side of the substrate; and patterns of orthographic projections of the plurality of nanopillars on the substrate comprise at least two types of patterns;

wherein the super surface structure comprises: two first super surface gratings arranged symmetrically about the first symmetry axis, and two second super surface gratings arranged between the two first super surface gratings and arranged symmetrically about the first symmetry axis;

wherein a refractive index of the super surface structure is greater than a refractive index of the light guide element.

2. The display apparatus according to claim 1, wherein the coupling-out structure comprises two coupling-out gratings;

wherein an orthographic projection of the coupling-out grating on the first surface is located within an orthographic projection of the first super surface grating on the first surface;

the coupling-out grating is configured to reflect a light reaching the second surface in such a way that a propagation direction of a reflected light is perpendicular to the first surface.

3. The display apparatus according to claim 2, wherein the two coupling-out gratings are symmetrically arranged with respect to the first symmetry axis.

4. The display apparatus according to claim 2, wherein the two second super surface gratings are is configured to transmit light waves reflected by an object at a side of the second surface facing away from the first surface to human eyes.

5. The display apparatus according to claim 1, wherein the image source assembly further comprises:

a light wave deflection structure, configured to reflect the light waves emitted from the image source to the side surface to enter the light guide element, causing the light waves entering into the light guide element from the side surface to undergo total reflection transmission within the light guide element.

6. The display apparatus according to claim 5, wherein the light wave deflection structure is a flat mirror.

7. The display apparatus according to claim 1, wherein the image source comprises a spatial light modulator for loading a hologram.

8. The display apparatus according to claim 7, wherein the spatial light modulator is one of: a liquid crystal spatial light modulator, a digital micro-mirror spatial light modulator, or an adjustable super surface spatial light modulator.

9. The display apparatus according to claim 1, wherein the plurality of nanopillars are divided into multiple first units, each first unit comprises multiple nanopillars whose orthographic projections on the substrate having patterns of at least two types; types of patterns of orthographic projections of nanopillars for different first units on the substrate are the same.

10. The display apparatus according to claim 9, wherein the nanopillar comprises a first portion and a second portion between the substrate and the first portion;

orthographic projections of first portions of the multiple nanopillars in each first unit on the substrate have patterns of at least two types, and orthographic projections of second portions of the multiple nanopillars in each first unit on the substrate have a same pattern.

11. The display apparatus according to claim 9, wherein sizes and rotation angles of multiple nanopillars whose orthographic projections on the substrate having the same pattern in different first units are not exactly the same.

12. The display apparatus according to claim 11, wherein the nanopillar comprises a first portion and a second portion; and sizes and rotation angles of multiple first portions whose orthographic projections on the substrate having the same pattern in different first units are not exactly the same.

13. The display apparatus according to claim 9, wherein shapes of orthographic projections of the multiple nanopillars in each first unit on the substrate comprise at least two of: rectangle, triangle, rhombus, circle, or ellipse.

14. The display apparatus according to claim 1, wherein types of patterns of orthographic projections, on the substrate, of nanopillars comprised in a first unit in the first super surface grating and types of patterns of orthographic projections, on the substrate, of nanopillars comprised in a first unit in the second super surface grating are the same; and a phase distribution of nanopillars in the first super surface grating is different from a phase distribution of nanopillars in the second super surface grating.

* * * * *